July 28, 1970         H. T. FINDLAY         3,522,344

FLEXIBLE SELF-SUPPORTING CUT RESISTANT WRITING ELEMENT

Filed May 10, 1968

INVENTOR
HUGH T. FINDLAY

BY David M. Burrell

ATTORNEY.

United States Patent Office 3,522,344
Patented July 28, 1970

3,522,344
FLEXIBLE SELF-SUPPORTING CUT RESISTANT
WRITING ELEMENT
Hugh T. Findlay, Lexington, Ky., assignor to International Business Machines Corporation, Armonk, N.Y.,
a corporation of New York
Filed May 10, 1968, Ser. No. 728,236
Int. Cl. B32b *31/30;* B41m *5/10*
U.S. Cl. 264—255                                    4 Claims

ABSTRACT OF THE DISCLOSURE

A flexible, self-supporting, cut resistant, reusable writing element is formed by coating on a polymer film such as polyurethane a dispersion of an ink receptive particulate filler material such as woodflour dispersed in a liquid which is at least a partial solvent for the polymer film. The liquid is evaporated to form a layer of filler material embedded in the surface of the polymer film. The filler material is then impregnated with a nonvolatile liquid ink.

BACKGROUND OF THE INVENTION

With the advent of numerous strong, synthetic polymer materials a variety of reusable transfer media such as typewriter ribbons and carbon papers have evolved which utilize as a support or transfer layer, films of the synthetic polymers. One such transfer medium is a polymer matrix containing in its pores a marking material which is forced from the polymer matrix onto a copy sheet under the pressure of, for example, a type die. While transfer media of this type have been produced which give excellent results both as to writing qualities and use life they are still subject to a number of disadvantages. One of the primary disadvantages is the fact that under repeated impact from a type die the polymer becomes distorted and does not return to its original shape such that embossing occurs and even cutting of the ribbon by the type die. Aside from causing the quality of the prints to deteriorate and weakening the transfer media, the embossing also creates problems in the proper feeding of the ribbon through the guides.

These problems have been overcome by providing a compressable transfer layer which is compressed by the type die rather than being distorted so that very little embossing occurs and the transfer medium is also rendered cut resistant.

BRIEF DESCRIPTION OF THE INVENTION

In accordance with this invention there is provided a process for producing a transfer medium comprising coating on a polymer film a dispersion of an ink receptive particulate filler material dispersed in a liquid which is at least a partial solvent for the polymer film. The liquid is evaporated to form a layer of filler material embedded in the surface of the polymer film, which layer is then impregnated with a nonvolatile liquid ink.

A transfer medium is produced which comprises a polymer film having an ink impregnated, particulate filler material embedded in the surface of the polymer film.

DRAWINGS

DETAILED DESCRIPTION

Figure 1:
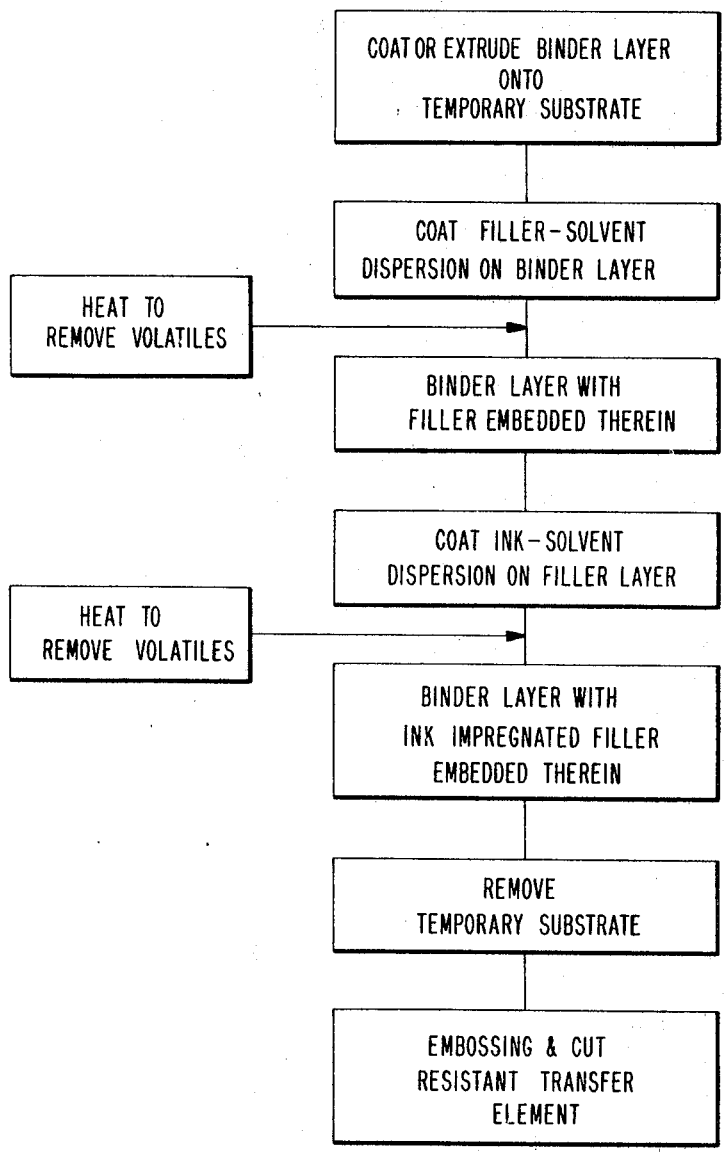
FIG. 1 is a flow diagram illustrating an embodiment of the process of the invention.

A variety of polymer films can be used as the backing or binder layer for the ink carrying, particulate filler material. The films are formed having a caliper between about 0.00015 inch to 0.0045 inch depending upon the type of trannsfer medium to be produced i.e. typewriter ribbons or carbon paper for example. The films can be formed by conventional methods such as being cast from a volatile dispersant or by extrusion. Suitable polymer materials include, for example, polyurethane, polyamide, polyester, polycarbonate, polyethylene, etc. The polymer film can contain up to about 80 percent by weight of a stiffening or complexing filler for example, carbon black such as is described in the copending application of Findlay and Horne Ser. No. 428,892 filed Jan. 25, 1965 now U.S. Pat. No. 3,392,042.

Advantageously the polymer film is supported on a temporary substrate such as glassine paper, Mylar (polyethylene glycol terephthalate), polypropylene, polyethylene, release papers, etc. which can be easily stripped from the polymer backing layer to produce the self-supported writing element.

A particulate ink receptive filler material is dispersed in a solvent by conventional techniques and coated by any convenient means onto the surface of the polymer backing layer. Suitable fillers include for example woodflour, asbestos, fines, glass, diatomaceous earth, and synthetic polymers such as powdered high density polyethylene. The fillers are dispersed, preferably in amounts by weight of 15 to 30 percent, in a volatile liquid which must be at least a partial solvent for the polymer film binder layer.

Suitable solvents include, for example, ethanol, ethyl acetate, N-methyl-2-pyrrolidone, methylene chloride, toluene, etc. The particular solvent is chosen with respect to the polymer film, for example, ethanol is a good solvent to use with polyamides such as nylon, mixtures of ethylene acetate and N-methyl-2-pyrrolidone are used with solvent soluble polyurethane, methylene chloride for polycarbonates and hot toluene for polyethylene. The dispersion of filler in solvent is coated onto the polymer film binder layer and evaporated either at ambient temperatures or at elevated temperatures of up to about 300° F. so as to cause sufficient dissolution of the surface of the polymer film so that the filler particles become embedded in the polymer layer when the solvent is evaporated. The thickness of the coated wet layer, depending upon the concentration of filler in solvent, is selected to give a dry filler layer of from 0.00025 inch to 0.0025 inch in thickness.

When the solvent has been removed to form a dry composite of binder layer embedded with filler then a nonvolatile liquid ink is impregnated into the filler. Preferably a dispersion of the ink in a volatile solvent is formed and then coated onto the filler surface by conventional coating techniques. Suitable inks are those conventionally employed in transfer media, and comprise coloring material dispersed or dissolved in an oily ink vehicle.

Coloring materials include, for example, organic and inorganic dyes and pigments such as dye treated carbon blacks, nigrosine oleate, and organic dyestuffs such as methyl violet base.

Suitable ink vehicles includes, for example, mineral oil, fatty acids, such as stearic and oleic acids, and their esters with both polyethylene glycols and fatty alcohols for example mixed octyl esters of oleic acid.

Conventional dispersing agents can also be included to aid in dispersing the pigment in the vehicle.

A non-separating ink is conveniently produced by milling the above components on a roll mill until a fineness of grind measurement of a mil or less on the Hegman fineness of grind gauge is obtained.

Preferably the ink is then mixed, until homogeneous, with a suitable volatile solvent which reduces its viscosity and aids in coating and impregnating the filler layer. Concentrations of ink and solvent of from about 15 to 30 percent by weight give excellent results in coating and impregnating properties. Suitable solvents are conventional and should be chosen so that no excessive attack on the binder layer occurs which might weaken or destroy the filler-polymer layer structure. Preferred solvents include for example lower aliphatic hydrocarbons such as petroleum distillates, pentane, hexane, etc. and halogenated aliphatic hydrocarbons such as 1,1,1 trichloroethane.

The solvent and ink composition is applied to the surface of the filler layer in a sufficient amount to produce, when the solvent is evaporated, a transfer layer containing from 1 to 4 parts by weight of filler impregnated with from 1 to 2 parts by weight of ink or ink deposits of from about 2½ to approximately 20 pounds per ream (500 sheets 20" x 30"). Upon evaporation of the solvent at ambient or elevated temperatures of up to about 300° F., the novel transfer medium is obtained which, when stripped from the temporary substrate, is ready for use upon slitting or cutting to the desired size and shape, for example, typewriter ribbons or carbon paper.

FIG. 1 is a flow diagram which illustrates the steps of a preferred embodiment of the process which is described above. The process and article of the invention is further illustrated by, but not intended to be limited to the following examples wherein parts are parts by weight unless otherwise indicated.

EXAMPLE 1

A 0.002 inch thick dry polymer film was cast from an emulsion of polyurethane in water (P 102A, Wyandotte Chemical Company) onto a temporary polyethylene glycol terephthalate (Mylar) substrate having a thickness of 2 mils. The coating was accomplished by using a reverse roll coater and the layer was dried by passing it through an air circulating oven at an air temperature of 275° F.

Two parts of Superfine woodflour (powdered wood from Composition Materials Company) were dispersed in a solvent mixture comprised of nine parts of Jaysol (denatured ethanol ethanol containing 5% traces of ethyl acetate, hexane, and water from Amsco Solvents) and one part of N-methyl-2-pyrrolidone. The solvent-woodflour dispersion was cast onto the surface of the Mylar supported polyurethane film by using a reverse roll coater such as is described, for example, in copending application S.N. 536,557 filed Mar. 9, 1965 now U.S. Pat. No. 3,413,184 and assigned to the assignee of this application. The solvent was removed by evaporation by heating the coated film in an air circulating oven at an air temperature of about 250° F. for approximately two minutes. The woodflour became embedded and fixed to the polyurethane film as a result of the softening and dissolving action of the heated solvent, particularly the N-methyl-2-pyrrolidone portion, on the surface of the polyurethane film. The dry caliper measurement of the binder layer was approximately 0.001 inch.

The following nonvolatile liquid ink composition was prepared:

| Component: | Percent by weight |
| --- | --- |
| Black toner 1686 dye treated carbon black from Dye Specialities Company | 6 |
| Black toner 2451L dye treated carbon black from Paul Uhlich Company | 10 |
| Nigrosine oleate (1 nigrosine base N:2 oleic acid) | 63 |
| Methyl violet base dyestuff from Du Pont Chemical Company | 3 |
| Ohopex R-9 mixed fatty acid esters from Ohio Apex Company | 18 |
| | 100 |

The above ingredients were mixed together and milled on a three roll, roller mill until a fineness of grind measurement of less than 1 mil on the Hegman fineness of grind gauge was obtained. An ink coating mixture suitable for impregnating the filler layer was prepared by mixing one part of the mixed ink prepared above with three parts of the solvent, 1,1,1 trichloroethane, until a homogeneous mixture was obtained. The solvent-ink composition was applied to the surface of the woodflour layer by the reverse roll coating technique in a thickness to produce a woodflour layer containing one part of ink per part of filler when the solvent was removed by heating the coated filler-polymer-binder layer in an air circulating oven at an air temperature of 250° F. for approximately two minutes.

The temporary Mylar substrate was then stripped from the finished transfer element. A portion of the transfer layer was slit to provide a typewriter ribbon which, when placed in a typewriter, gave only a very slight decline in print quality after 26 strikeovers on the same spot on the ribbon and there was no evidence of cutting and only very slight embossing had occurred.

Figure 2:
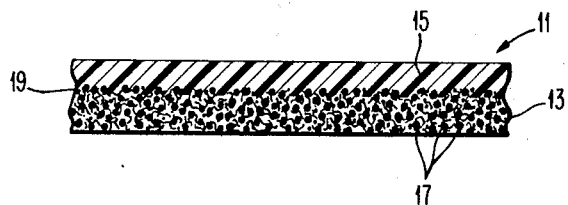
FIG. 2 is a cross sectional view of a novel transfer medium made in accordance with the process of the invention.

The transfer element 11 prepared by the process of Example 1 is illustrated in FIG. 2 and comprises a filler layer 13 embedded in the polymer film 15 and impregnated with ink 17 which is non-volatile and incompatible with the polymer layer, although a slight amount of the ink may extend into the surface of the polymer layer at the filler-polymer layer interface 19. The embossing and cut resistance is achieved because, although the type blow distorts the polymer layer outwardly and temporary distorts the ink and filler layer, the filler is highly compressible and is also transferrable. Therefore, a portion of the ink and filler are transferred at each blow and that which remains as part of the ribbon is compressed by the type blow so that little distortion of the printing surface of the ribbon occurs which is of a permanent nature. Thus, regardless of any limitations imposed by the strength of the polymer, little if any embossing or permanent distortion of the filler and ink layer results even after repeated type blows.

EXAMPLE 2

A polymer backing layer of nylon was formed on a temporary Mylar substrate by dissolving 1.5 parts by weight of Elvamide 8641 (Du Pont Chemical Company) and a complexing filler 0.15 part by weight of Channel black (Mogul base S—Cabot Company) in a mixture of 12.0 parts by weight of Jaysol and 3.0 parts by weight of water. The alcohol and water were first mixed together and heated to approximately 150° F. after which the nylon was added and mixed using a Cowles dissolver for about five minutes with heat being applied. Mixing was continued for an additional 30 to 40 minutes as the mixture was cooled to room temperature. The channel black was then added and thoroughly mixed and wetted by use of a homogenizer (15M8BA SMD—Ser. No. 1230586606, a product of the Manton-Gaulin Manufacturing Company). The homogenizer circulated the mixture through a needle valve arrangement in which the mixture was forced through an opening and opposed by a needle, the fluid mixture being thus dispersed as it exits. The mixture was collected and returned for a second pass through the homogenizer which completed the mixing and the wetting of the carbon black by the nylon-alcohol-water solution. The backing layer was cast onto the Mylar substrate in accordance with the procedure described in Example 1 above and the solvent removed by drying in a hot air oven at about 270° F. The coating had a dry caliper of 0.001 inch. A dispersion of 30 percent by weight of asbestos fibre (asbestos fines) in ethanol was then applied to the surface of dry nylon film and the asbestos fibre was embedded into the ethanol softened nylon as the solvent was evaporated at room temperature which took about 3 minutes. The filler layer was about 0.00025 inch in thickness. The same ink formulation dissolved in 1,1,1 trichloroethane which was utilized in Example 1 was then coated onto the asbestos fibre layer and the solvent removed by heating in an air circulating oven at an air temperature of about 270° F. for 2 minutes. The amount of ink contained in the medium was about 2½ pounds per ream. After the transfer medium was stripped from the temporary substrate a portion of the medium was cut in the form of a carbon paper which after repeated use showed only slight lightening of print intensity, no signs of cutting and only slight embossing.

EXAMPLE 3

The process of Example 1 was repeated using as the polymer layer an ethylene acetate copolymer which was coated on a polyethylene temporary substrate to a caliper of 0.0025 inch from an aqueous emulsion upon drying in an air oven at about 140° F. The filler diatomaceous earth, sufficient to form a layer having a caliper of 0.0015 inch on the polymer underlayer was impregnated into the ethylene acetate copolymer film from a fifteen percent by weight solution in methylene chloride. The solvent was removed by heating in an air oven for 2 minutes at 120° F. Two parts per part of filler of the ink formulation of Example 1 was then impregnated into the dry diatomaceous earth layer by coating the ink-solvent mixture of Example 1 and evaporating the trichloroethane solvent by heating in an air oven at 120° F. for 3 minutes. The finished dry transfer medium was suitable for use as a typewriter ribbon when cut to size and stripped from the temporary polyethylene substrate.

EXAMPLE 4

A polymer underlayer of polycarbonate film .0020 inch thick (Lexan, General Electric Company) was formed on a temporary Mylar (polyethylene glycol terephthalate) substrate by extruding the polycarbonate in the form of a sheet onto the surface of 2 mil thick Mylar film. A filler, powered polyethylene (Microthene M–711–939 from U.S. Industrial Chemical Co.) was dispersed in methylene chloride so as to form a concentration of 20 percent filler by weight. The resulting dispersion was then coated onto the surface of the polycarbonate film. The methylene chloride softened the surface of the film so that the filler was embedded into the polycarbonate layer. The methylenechloride was removed by heating the coated polymer film in an air circulating oven 120° F. for 3 minutes. A wet coating thickness of about 10 mils was sufficient to give a dry caliper layer of 0.0020 inch of filler on the polycarbonate. The dry polyethylene filler surface was then impregnated with ¼ part per part of filler of the ink formulation of Example 1 contained in 1,1,1-trichloroethane. The solvent was removed by heating in an air oven at 120° F. for 3 minutes. The finished element, when stripped from the temporary Mylar substrate, gave excellent image quality after repeated overstrikes with no sign of cutting and only slight embossing occurred.

EXAMPLE 5

A 0.001 inch thick polymer coating of solvent soluble polyurethane (Estane 5701–F1, B. F. Goodrich Company) was formed on a temporary 2 mil thick Mylar substrate by coating from a 12% by weight solution of the polymer in a solvent mixture comprised of 9 parts by weight of ethyl acetate and one part by weight of N-methyl-2-pyrrolidone and evaporating the solvent at room temperature. A 0.0005 inch thick layer of glass filler was then embedded in the polymer underlayer by coating onto the polymer film a dispersion of a fifteen percent by weight of glass filler dispersed in a solvent mixture comprising nine parts by weight of ethyl acetate and one part by weight of N-methyl-2-pyrrolidone. The solvent was removed by evaporation by heating in an air circulating oven at an air temperature of about 275° F. for approximately two minutes. The glass filler was then impregnated with the ink formulation of Example 1 in 1,1,1 trichloroethane which was coated to a wet thickness sufficient to produce an ink deposit of about 1 part ink to 2.0 parts of filler when the solvent was removed. After removal of the volatile materials the Estane film was stripped from the temporary substrate. A sample of the transfer element, when cut to the size of a typewriter ribbon, gave heavy ink transfer with very little decline in print quality after repeated strikeovers. The ribbon sample showed no evidence of cutting and only very slight evidence of embossing.

The foregoing has described a novel process which produces a novel, flexible, self-supporting writing element which is reusable and resistant to embossing and cutting while producing high print quality even after extended use. A polymer film based transfer element is produced which can overcome the problems resulting from embossing and cutting of the polymer support and transfer layers by the type element. These problems heretofore frequently lead to poor print quality, ribbon failure, and poor feedability. The polymer layer is essentially ink free and there is no need to disperse ink in polymer as in the preparation of matrix transfer media so that the polymer film can be produced by convenient techniques such as by extrusion or solvent coating. Uniform polymer layers are easily formed.

While the invention has been particularly shown and described with reference to preferred embodiments thereof it will be understood by those skilled in the art that the foregoing and other changes in form and details may be made therein without departing from the spirit and scope of the invention.

I claim:

1. A process for producing a transfer medium comprising coating on a polymer film having a thickness of between about 0.00015 with a 0.0045 inch a binder free dispersion of an ink receptive finely divided, particulate, filler material in a liquid which is at least a partial solvent for said polymer film, evaporating said liquid to form a layer of said material having a thickness of between about 0.00025 inch and 0.0025 inch embedded in said polymer film, and impregnating said material with a nonvolatile, liquid ink in an amount sufficient to produce a transfer layer comprising between about 1 to 4 parts by weight of filler material and between 1 to 2 parts by weight of ink.

2. A process for producing a transfer medium comprising coating on a polymer film having a thickness of between about 0.00015 with a 0.0045 inch, a binder free, finely divided, particulate, ink receptive filler material dispersed in a volatile liquid which liquid is at least a partial solvent for said polymer, evaporating said liquid to form a layer of filler material having a thickness of between about 0.00025 inch and 0.0025 inch embedded in the surface of said polymer film, impregnating said material with a nonvolatile liquid ink dispersed in a volatile solvent in an amount sufficient to produce a transfer layer comprising between about 1 to 4 parts by weight of filler material and between 1 to 2 parts by weight of ink, and removing said solvent.

3. A process for producing a transfer medium comprising supporting a polymer film having a thickness of between about 0.00015 with a 0.045 inch on a temporary substrate, coating on said film an ink receptive binder free, finely divided, particulate, filler material dispersed in a volatile liquid which is at least a partial solvent for said polymer film, evaporating said liquid to form a layer of said filler material having a thickness of between about 0.00025 inch and 0.0025 inch embedded in the surface of said polymer film, coating onto said embedded material a nonvolatile liquid ink dispersed in a volatile solvent in an amount sufficient to produce a transfer layer comprising between about 1 to 4 parts by weight of filler material and between 1 to 2 parts by weight of ink, removing said solvent, and stripping said transfer medium from said temporary substrate.

4. The process of claim 3 wherein said polymer binder layer contains up to about 80 percent by weight of a complexing filler.

References Cited

UNITED STATES PATENTS

| | | |
|---|---|---|
| 2,508,725 | 5/1950 | Newman. |
| 3,049,457 | 8/1962 | Peshin et al. |
| 3,411,935 | 11/1968 | Winzer. |
| 3,463,697 | 8/1969 | Findlay et al. |

MURRAY KATZ, Primary Examiner

U.S. Cl. X.R.

117—36.4, 138.8; 161—165, 227; 264—171